R. L. WALSH.
SECONDARY OR STORAGE BATTERY.
APPLICATION FILED MAR. 6, 1920.
1,436,616.
Patented Nov. 21, 1922.
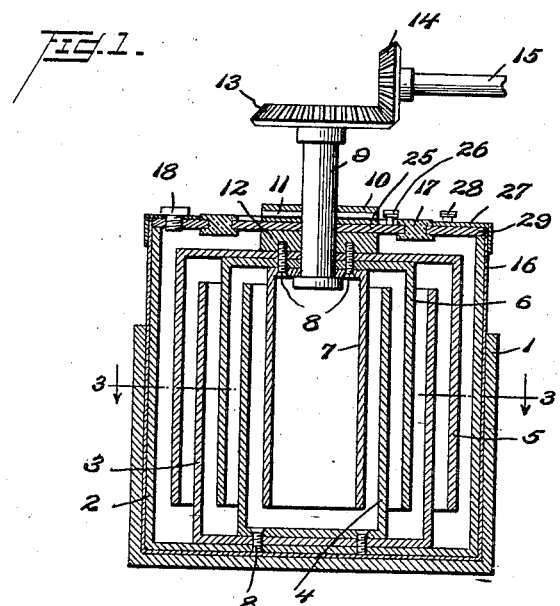
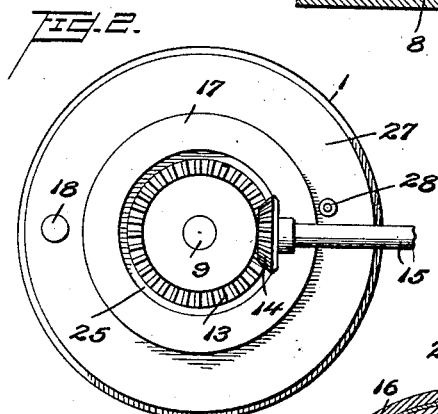
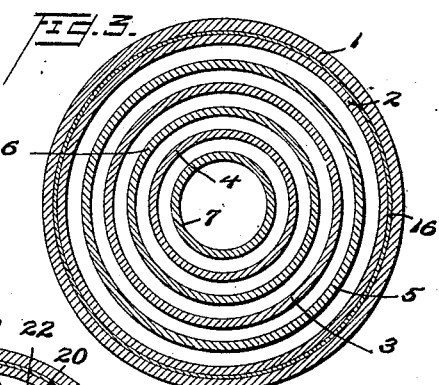
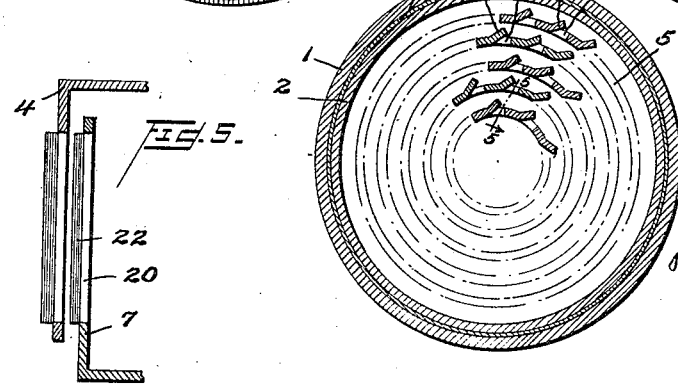
Inventor
Robert L. Walsh Patented Nov. 21, 1922.

1,436,616

UNITED STATES PATENT OFFICE.

ROBERT L. WALSH, OF WASHINGTON, DISTRICT OF COLUMBIA.

SECONDARY OR STORAGE BATTERY.

Application filed March 6, 1920. Serial No. 363,793.

*To all whom it may concern:*

Be it known that I, ROBERT L. WALSH, a citizen of the United States, residing at Washington, in the District of Columbia, have invented certain new and useful Improvements in Secondary or Storage Batteries, of which the following is a specification.

This invention relates to secondary or storage batteries.

More particularly the invention is directed to a method of and means for utilizing secondary or storage batteries, by the provision of means for relative movement between the electrodes and the electrolyte during the stage of charging.

In certain forms of the invention, one set of the electrodes is relatively fixed and the other set of electrodes rotatably movable thereto, and the electrodes of such set or sets may be perforated and of angular formation to provide for active circulation of the electrolyte in predetremined paths through the portions of the battery.

Further features and objects of the invention will be more fully understood from the following detail description and the accompanying drawings, in which:

Fig. 1 is a central vertical elevation of one form of my invention;

Fig. 2 is a top plan view of the same;

Fig. 3 is a horizontal section on the line 3—3 of Fig. 1;

Fig. 4 is a view corresponding to Fig. 3 but showing a modified form of electrodes, and Fig. 5 is a detail vertical sectional elevation on the line 5—5 of Fig. 4.

Referring to Figs. 1, 2, and 3, the container 1 of the secondary or storage battery is of any suitable material. Within the container 1 is provided sets of electrodes of opposite polarity and in the particular form shown in Fig. 1 the electrodes are selected in a form for relative rotatable movement. The electrodes are selected of suitable material as may be preferred. The set of electrodes 2, 3, 4, of one polarity, are shown as in the form of cylinders of varied diameter, nested one within the other; similarly, the electrodes 5, 6, 7, of the other polarity are shown in the form of cylinders of varied diameter, nested one within the other and respectively between the electrodes of the other set. Such set of nested electrodes of the same polarity may be cast integrally with one another or detachably secured to one another by means of rivets 8, bolts, screws, or the like. The set of electrodes 5, 6, 7 are suspended from the shaft 9, mounted for vertical rotation within the secondary or storage battery by suitable bearing means, comprising the fixed surface 25, the bearing block 10 resting on said surface 25 and fixed to the shaft 9 by the pins 11, or equivalent. The electrodes 5, 6, 7, may be fixed to the lower bearing block 12 by the screws 8. The shaft 9 is driven by any suitable means, as by the gears 13, 14 and driving shaft 15.

The battery proper may be formed of the outermost electrode 2 as its lateral side and bottom, the outer faces of the electrode 2 being coated or lined with suitable protective and supporting material 16. The cover is provided with suitable discharge and filling openings 18, with screw threaded or like replaceable closures.

In the form of the invention shown in Figs. 4 and 5, the electrodes of one or both sets, if desired, are slotted and adjacent such slots the portions of the electrodes are formed angularly to the body portion of the electrodes to provide passage ways 20, 21 respectively in the electrodes of the opposing polarity, and also to provide for the respective angular portions 22, 23 whereby upon rotation of the movable set of electrodes the electrolyte is effectively circulated through the respective sets of passage ways 20, 21.

The various forms of my invention are particularly valuable during the stage of charging the battery with any suitable charging source and I have discovered that the elapsed time of charging is markedly reduced and also that the rapid charging is effected without detriment to the parts of the battery at relatively high amperages, due primarily, as I have discovered to the rapid release of the gas, thereby reducing the temperature of the electrolyte or the electrodes while charging at the high amperage, and also cooling the battery, and further that the electrodes will take a charge of greater amperage than in constructions heretofore proposed.

In the particular form of my invention I have indicated means for securing relative movement between the electrolyte and the electrodes by positively rotating one set of electrodes, thereby agitating the electrolyte relative to the other electrode, and in a similar manner, such means may be utilized for positively circulating the electrolyte and thereby obtaining movement of the electrolyte relative to both electrodes, or the electrolyte may be circulated through a path exteriorly of the cell as by means of the centrifugal pump and suitable piping connected therewith. In these various forms of my circulating means, the electrodes in either or both sets may be provided with passage ways or angular portions, or both. In a similar manner, both electrodes or sets of electrodes may be rotated relatively to the electrolyte or to one another, in the same or opposite direction.

The cover 11 may be formed in whole, of insulating material or be made of sections, one section 29 being of conducting material and lined with the same material as the electrode 2 and the other section 25, being of conducting material and lined with the same material as the electrode 5. The sections 29 and 25 being separated by the insulation ring 17.

The energy for operating the rotating means of the battery such as the shaft 9 and its driving means is preferably supplied from a source other than or exteriorly of the battery and in my co-pending application I have set forth an explosive engine or a gas engine or other prime mover also a source of power current such as municipal electrical systems or the equivalent as suitable sources for the aforesaid purposes of my invention of attaining relative movement of the electrolyte and the electrodes during the stage of charging.

Whereas I have shown and described my invention by reference to specific forms thereof, it will be understood that various changes in materials may be made without departing from my invention as set forth in the appended claims.

What I claim is:

1. In a storage battery, two electrodes each comprising a series of cup-shaped members nested together and having their end walls fastened together in electrical contact, the members of one series being disposed reversely to and overlapping the members of the other series, a rotatable element to which one series of said members is fastened, and terminal posts on the end walls of the outermost members of the two series.

2. In a storage battery, two electrodes each comprising a series of cup-shaped members nested together and having their end walls fastened together in electrical contact, the members of one series being disposed reversely to and overlapping the members of the other series, the side walls of said members having through openings and angular projecting portions extending at an angle across said openings.

In testimony whereof I affix my signature.

ROBERT L. WALSH.